United States Patent [19]
Langley et al.

[11] 3,731,524
[45] May 8, 1973

[54] FLUIDIC CONTROL CIRCUIT

[75] Inventors: Lawrence W. Langley; Gilbert Alexander Cotta, both of Raleigh, N.C.

[73] Assignee: Corning Glass Works, Corning, N.Y.

[22] Filed: Dec. 13, 1966

[21] Appl. No.: 601,490

[52] U.S. Cl. .................................73/45.1, 137/81.5
[51] Int. Cl. .........................G01m 3/26, F15c 1/08
[58] Field of Search ..........................73/45.1, 45.2; 137/81.5

[56] References Cited

UNITED STATES PATENTS

| | | | |
|---|---|---|---|
| 3,426,582 | 2/1969 | McArthur et al. | 73/45.1 |
| 3,426,583 | 2/1969 | McArthur et al. | 73/45.1 |
| 2,951,364 | 9/1960 | Sherrill | 73/45.2 |
| 3,198,004 | 8/1965 | Roberts et al. | 73/45.1 |
| 3,260,271 | 7/1966 | Katz | 137/81.5 X |
| 3,292,648 | 12/1966 | Colston | 137/81.5 X |
| 3,343,790 | 9/1967 | Bowles | 137/81.5 X |
| 3,363,452 | 1/1968 | McArthur | 73/45.2 |
| 3,363,595 | 1/1968 | Braudriff et al. | 137/81.5 X |
| 3,366,129 | 1/1968 | Schoppe, Jr. et al. | 137/81.5 |
| 3,377,843 | 4/1968 | Rudszinat | 73/45.2 |

FOREIGN PATENTS OR APPLICATIONS 1,205,434 11/1965 Germany.............................73/45.2

*Primary Examiner*—S. Clement Swisher
*Attorney*—Clarence R. Patty, Jr., Walter S. Zebrowski and William J. Simmons, Jr.

[57] ABSTRACT

A fluidic control circuit for monitoring a fluid signal and providing a fluid output pulse when the amplitude of the monitored signal falls below a predetermined threshold level, the phase of the output pulse being delayed with respect to the time at which the monitored signal falls below the threshold level. When the monitored signal is a train of fluid pulses, there is provided a train of fluid timing pulses having the same frequency as the monitored signal. A pneumatic trigger and NOR gate are combined in a circuit receiving the monitored signal and timing signal to provide an output pulse, the width of which is determined by the width of a timing pulse and the phase of which is determined by the time occurrence of the timing pulse. The addition of a second NOR gate and a fluid flip-flop to the control circuit permits the generation of an output pulse having a width determined by the time between two successive timing pulses, thus providing the control circuit with memory.

22 Claims, 5 Drawing Figures

PATENTED MAY 8 1973

INVENTORS.
GILBERT A. COTTA
LAWRENCE W. LANGLEY
BY
William J. Simmons Jr.
ATTORNEY

FLUIDIC CONTROL CIRCUIT

This invention relates to a fluid-operated logic circuit for generating a delayed fluid output pulse in response to a decrease in fluid pressure of an input signal below a given threshold level. This circuit is well suited for use in leak detection systems wherein articles are tested to determine the presence or absence of leaks therein, the fluidic logic circuit of the present invention being utilized to generate a fluid rejection or output pulse in response to an unacceptable level of back pressure developed by a tested article to which a back pressure sensor has been connected.

This method of inspection is applicable to any product or situation in which acceptance is or can be made to be dependent on a predetermined fluid pressure level. The most appropriate applications are those in which rejection of an unacceptable device can be accomplished directly by a jet of fluid, and in which inspections are carried out at a rate between 1 and 50 per second. The term "fluid" as used herein denotes any liquid, gas, or the like which may be used to operate fluid amplifiers. The particular fluid to be used in any given application may depend on the particular article to be tested.

Since the fluidic leak detection system of this invention is especially useful for the testing of cigarettes, the embodiment to be described herein relates specifically to a cigarette testing apparatus. The term "fluid" as applied to this specific embodiment refers to air. The particular fluid in any specific application may depend on the article being tested, economics, availability, etc. Those fluid signals which consist of a positive pressure followed by a pulse characterized by a decrease in pressure will be hereinafter referred to as negative pulses.

During the manufacture of filter tip cigarettes, it is common practice to bring two sections of cigarette into abutting relationship with the opposite ends of the filter section. A band of sealing paper is then placed around the section of filter material with its edges overlapping the ends of the cigarettes. These overlapping edges are bonded to the cigarettes, thereby forming a double unit hereinafter referred to as a rod. During the manufacturing process, this rod is cut at its center to form two filter cigarettes. It has been found to be con-venient to inspect cigarettes for leaks while they are still in the form of rods. Such a system must inspect the cigarette rods as they are manufactured and detect leaks between the filter material and the body of the cigarette as well as leaks in the cigarette paper.

A prior control system for detecting leaks in cigarettes during the manufacture thereof combined a thin diaphragm capacitance pressure transducer to measure the pressure of a metered flow of air through each cigarette rod, a filter bowl, an electronic amplifier, a register, a solenoid interposer, a toggle valve and a set of four-way valves on a rotating inspection drum. If the measured pressure were above a given threshold, e.g., approximately 3 inches of water, the cigarette was accepted; if it were below this threshold, it was rejected. A through-flow approach was used to obtain the input pressure signal in this prior system. In accordance with this method, one end of a cigarette rod was pressurized, and the resulting pressure was measured at the opposite end.

Some of the disadvantages of this prior system are as follows. Frequent maintenance of the pressure transducer was necessary to clean it of tobacco particles and dust, despite the existence of a filter between it and the cigarette. The filter had to be emptied once a day. The dynamic response of the system was unacceptable because of the filter and the connecting line volume. This is critical since it limits the speed at which the inspection machine can operate. Although the electronic-mechanical system of inspection was relatively trouble free, it was very complex. Tobacco entrainment in the system and progressive blockage of its orifices necessitated frequent adjustments by the operator.

The fluidic circuit of the present invention may be utilized to act upon a fluid inspection pulse having an amplitude which is related to the rate at which fluid leaks from an article being tested. This circuit generates a fluid rejection pulse if the amplitude of the inspection pulse is below a predetermined threshold level.

It is an object of the present invention to provide a fluidic control circuit for monitoring a fluid signal and providing a delayed indication of the falling of the amplitude of that signal below a predetermined threshold level.

Other objects and advantages of the invention and its mode of operation will become apparent upon consideration of the following description and the accompanying drawings in which.

Figure 1:
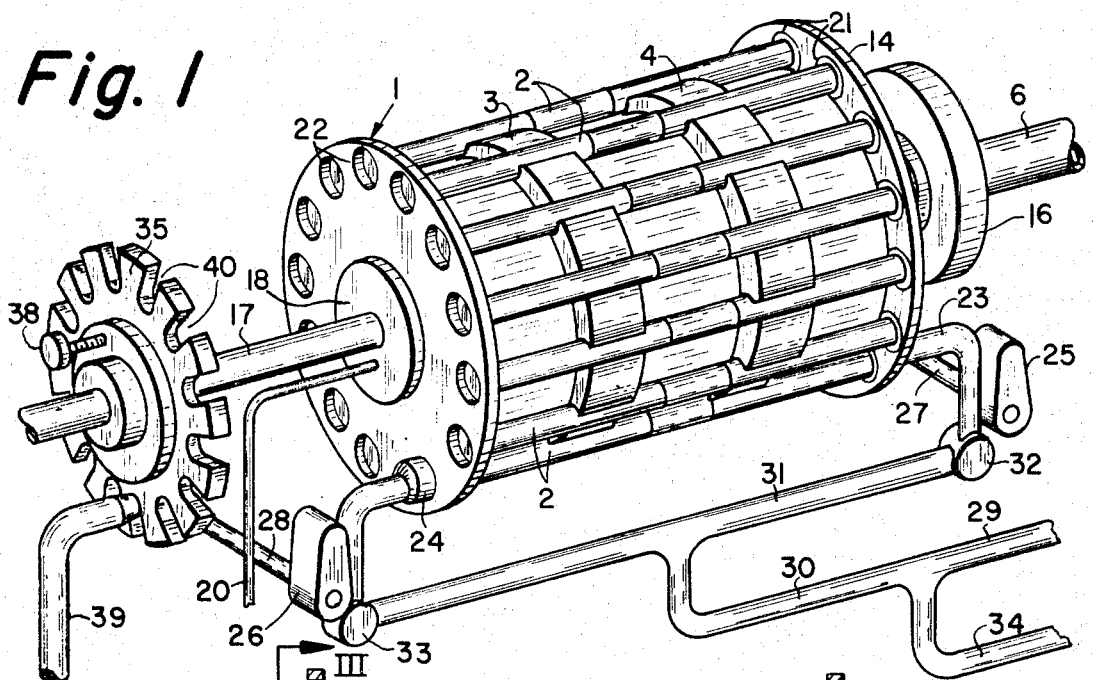
FIG. 1 is a perspective view of a cigarette inspection drum and timing signal generator which may be used with this invention.
Figure 2:
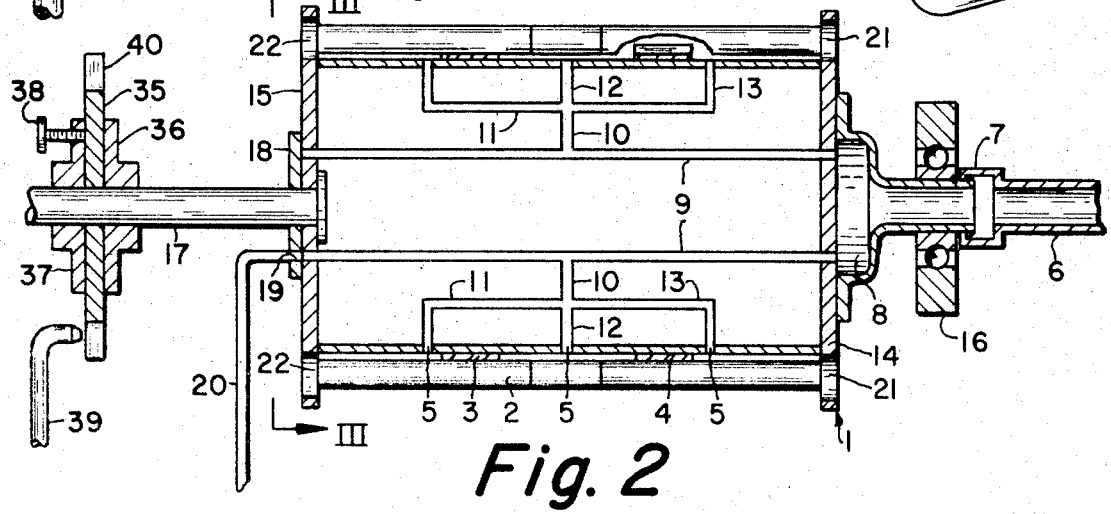
FIG. 2 is a cross-sectional view of the drum and timing generator illustrated in FIG. 1.
Figure 3:
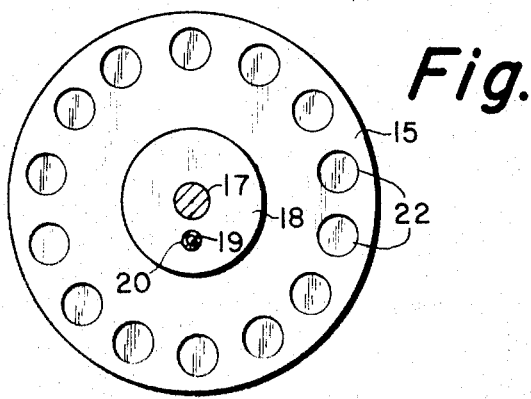
FIG. 3 is a cross-sectional view taken on the line III—III of FIG. 2.

Referring now to FIGS. 1, 2 and 3 wherein like numerals designate like parts, there is shown an inspection drum 1 having a plurality of double ended cigarette rods 2 secured thereto by a vacuum. The drum supports two grooved annular bands 3 and 4, the grooves of which are aligned with a plurality of vacuum openings 5 which are arranged around the drum so that there are three to a cigarette rod. A vacuum supply is connected through a pipe 6 and a rotatable coupling 7 to a vacuum manifold 8 which is secured to a flange-like end 14 of the drum 1. Each set of openings 5 is connected with the vacuum manifold 8 through a series of pipes 9, 10, 11, 12 and 13. The term "pipe" as used herein denotes any suitable means for conveying fluid signals, e.g., a pipe, tube, channel, duct or the like. As the drum 1 rotates, cigarette rods deposited thereon will be held in their respective grooves by the vacuum pressure and may be rotated to any desired position on the drum without falling therefrom.

The end 14 of the drum is rotatably supported by a bearing housing 16 while the end 15 thereof is mounted on a shaft 17, the bearings of which are not shown. A disc 18, which is rotatably mounted on the shaft 17 adjacent the end 15 of the drum, does not rotate with the drum. Therefore a hole 19 in the disc 18, in which the pipe 20 is secured, always remains below the shaft 17 as shown in the drawings.

Around the circumferences of the drum ends 14 and 15 are respectively situated a plurality of holes 21 and 22 which are aligned with the grooves in the annular bands 3 and 4. Nozzles 23 and 24 are situated adjacent the drum ends 14 and 15 respectively and are adapted to be inserted into one set of the holes 21 and 22 respectively. A source of fluid pressure (not shown) is coupled to the nozzles 23 and 24 by pipes 29, 30 and 31 and rotary couplings 32 and 33. A backpressure control signal, which is indicative of the amount of fluid leaking from the article being tested, appears at pipe 34.

In the embodiment shown in FIG. 1 there are 14 holes around the circumference of each of the ends 14 and 15. During the operation of the apparatus shown in FIG. 1 the drum rotates 1/14th of a revolution and then stops to permit one rod to be tested and then rotates another 1/14th of a revolution to permit the next rod to be tested, etc. During the time that the drum has stopped the nozzles 23 and 24, which are situated near the bottom of the drum, are inserted into the adjacent holes 20 and 21 by the action of cams 25 and 26 respectively. The cams 25 and 26 which are respectively mounted on rods 27 and 28, are actuated each time the drum has stopped by an appropriate mechanism (not shown). The ends of the nozzles 23 and 24 are slightly larger in diameter than a cigarette so that when the nozzles are inserted into the holes 21 and 22 the ends of the nozzles engage the cigarette rod to form an air-tight coupling.

The fluidic control circit of FIG. 4 requires a timing signal to adjust the phase of the output or rejection signal which is used, as will be hereinafter described, to eject a defective or leaky cigarette rod from the drum. The timing signal is required for this system to index the period of each cigarette inspection time, and also, to insure an output which is continuously off except when a leaky cigarette passes by. Since one timing pulse is required for each cigarette being inspected, the timing signal may be developed by a mechanical pulse generator which may consist of a slotted disc 35 facing an impacting air jet which issues from the orifice at the end of a pipe 39. To generate the required signal, the motion of the disc must be in a true plane and precisely concentric. The shape of the orifice or nozzle is important to a lesser extent to produce the required signal period and amplitude. The total pressure supplied to the line 39 controls the pneumatic amplitude level. The disc may be mounted as shown on the shaft 17 by two flanges 36 and 37 which are secured to the shaft. The phase of the timing signal may be adjusted by rotating the disc 35 to the proper angular alignment and then tightening a set screw 38. A timing signal having a very high signal-to-noise ratio is developed by this method, and it can be used directly in the fluidic control circuit without additional amplification.

The disc 35 could be rotated by a separate motor drive to give the desired timing signal. Another method of obtaining a timing signal would be to mount the pipe 39 so that the orifice thereof is adjacent one of the holes 21 or 22 at a location on the drum where no cigarette rod is being supported. If this method were used, the end of the drum would have to be in a true plane and meet the other requirements previously set forth with respect to the timing disc 35. The phase of the timing signal generated by this method could be adjusted by moving the pipe 39 relative to the holes on the drum.

To detect a leaky cigarette, the backpressure signal at pipe 34 of FIG. 1 must be monitored, and some indication must be given when this pressure falls below a predetermined threshold level. The control circuit of FIG. 4, which performs this function, comprises a pneumatic trigger 41, NOR gates 44 and 45, a load insensitive fluid flip-flop 46, and a double size or power fluid flip-flop 47. The pneumatic trigger 41 consists of a proportional amplifier 42 and a fluid flip-flop or bistable fluid amplifier 43. The power stream input nozzles P of the NOR gates 44 and 45 and the flip-flop 46 are directly connected to a power stream source designated at various points in the drawing as $P_o$. The amplifier 42 and flip-flops 43 and 47 are connected to the power stream source $P_o$ by restrictors 48, 49 and 50 respectively. An adjustable bias control valve 51 is interposed in the pipe which connects the restrictor 48 to the control nozzle 42D. The valve 51 is adjusted to bias the pneumatic trigger so that it switches at the required threshold rejection level. Output channels 44A and 45A of the NOR gates are shown in the drawing as being vented to the atmosphere at points V.

The control signal (A), which is obtained from pipe 34 of FIG. 1, is coupled to the control nozzle 42C by a pipe 53. The output channels 42A and 42B are respectively connected to the control nozzles 43C and 43D of the flip-flop 43. The output channels 43A and 43B are respectively connected to the control nozzles 44C and 45C of the NOR gates 44 and 45. A timing signal (B) is connected to the remaining control nozzles 44D and 45D of the two NOR gates by a pipe 54 which is connected to the pipe 39 of FIGS. 1 and 2. The amplitude of the timing signal is determined by the setting of an adjustable control valve 52 which connects the pipe 54 to the power stream source $P_o$. The NOR gate outputs 44B and 45B are respectively connected to the control nozzles 46C and 46D of the flip-flop 46. The output channels 46A and 46B are respectively connected to the control nozzles 47C and 47D of the power flip-flop 47. The output or rejection signal (G) appears at the output channel 47A.

Figures 4, 5:
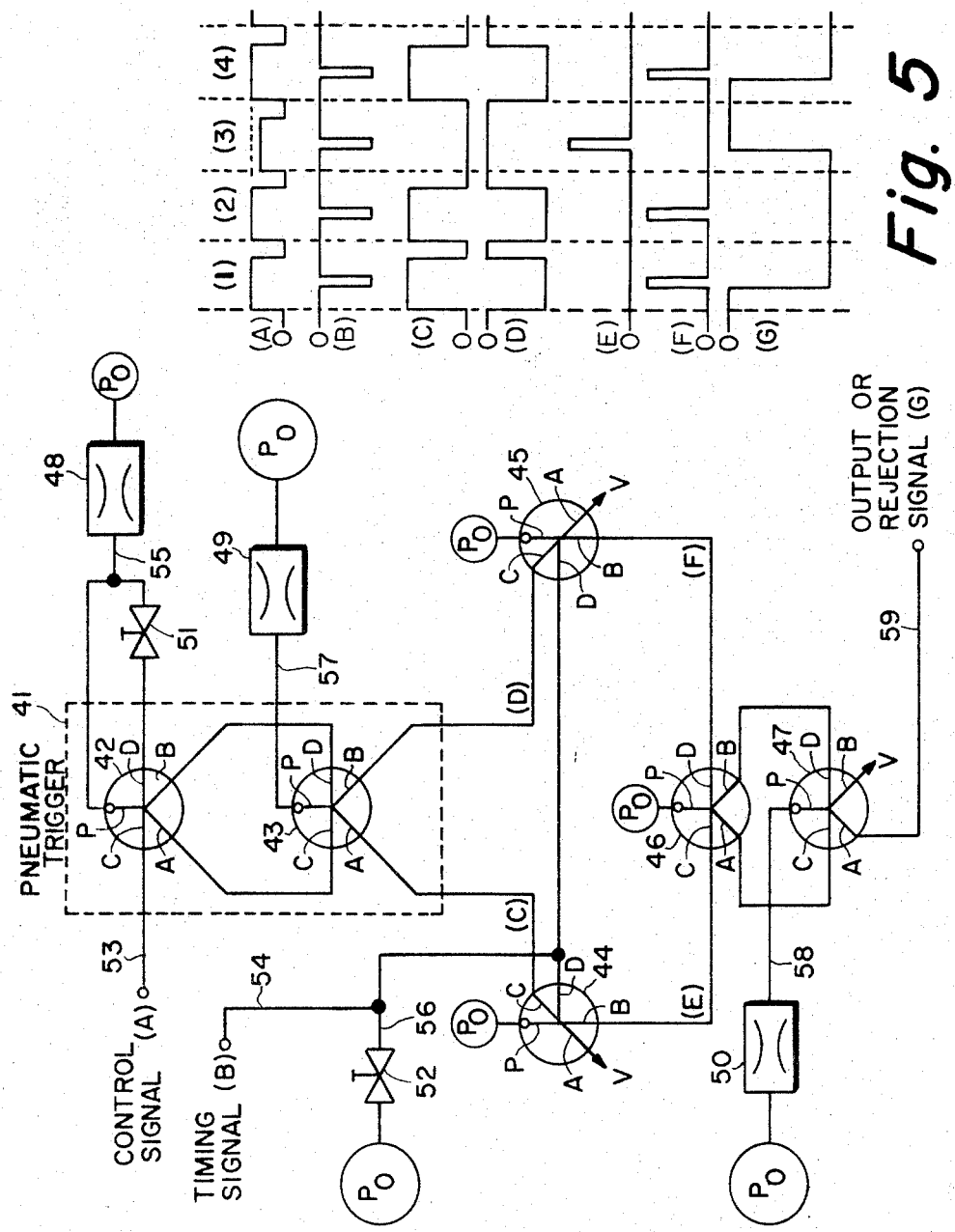
FIG. 4 is a schematic diagram of a fluidic control circuit for use in a leak detection system.
FIG. 5 is an idealized waveform diagram representing the instantaneous pressures which exist at various points of FIG. 4.

The operation of the fluid control system FIG. 4 can best be described by referring to the fluid signal diagram of FIG. 5, which consists of seven lines of waveforms labeled (A) through (G). This figure also contains four columns numbered (1) through (4). A reference to FIG. 5(A) indicates the entire waveform in line (A) of FIG. 5 while a reference to FIG. 5(A)(1) indicates the first pulse of line (A), i.e., that which appears in column (1) thereof.

When the nozzles 23 and 24 of FIG. 1 are pressed against the cigarette rod being inspected, the control signal (A) reaches a positive value represented by the signal 5(A). The amplitude of this signal sharply decreases when the nozzles are taken away from the inspected rod. In columns (1), (2) and (4) the control signal (A) has reached an acceptable level, whereas the pulse in FIG. 5(A)(3) is shown as falling below that acceptable level, thereby designating a faulty or excessively leaky rod. The timing signal (B), which is shown in FIG. 5(B), can best be described as a positive signal level having periodic negative pulses which are generated each time one of the slots 40 passes the orifice of pipe 39 of FIGS. 1 and 2. When the control signal (A) reaches the threshold level, i.e., when it is greater than the pressure level appearing at the control nozzle 42D as set by the control valve 51, the power stream at 42P is predominantly diverted to the output channel 42B. The power stream 43P is therefore diverted to the output 43A, the signal shown at FIG. 5(C)(1) therefore being represented by a positive fluid pulse while the signal appearing at FIG. 5(D)(1) being a negative fluid pulse. A positive fluid pulse exists at the output of a NOR gate when no fluid pulse exists at either of its two control nozzles. Therefore, when the control signal (A) reaches the threshold level for an acceptable rod, producing a negative pulse from the output 43B of the pneumatic trigger, which is in phase with the negative timing pulse (B), a positive fluid pulse will appear at the output channel 45B of the NOR gate 45 as is shown in FIG. 5(F)(1). This pulse, which is applied to the control nozzle 46D, deflects the power stream 46P so that a positive fluid pulse appears at the output channel 46A which in turn, when applied to the control nozzle 47C, deflects the power stream 47P to the output channel 47B which is vented to the atmosphere. The output or rejection signal (G) which appears at the output channel 47A is therefore negative as illustrated in FIG. 5(G)(1). However, when the control signal (A) is below the acceptable threshold value, as illustrated in FIG. 5(A)(3) of the pneumatic trigger 41, the signal appearing at the output channel 43A is a negative fluid pulse as illustrated in FIG. 5(C)(3). When this pulse, which is applied to the control nozzle 44C, and the timing signal (B), which appears at the control nozzle 44D are both negative, a positive fluid pulse appears at the output of the NOR gate 44 as shown in FIG. 5(E)(3). This positive fluid input to control nozzle 46C causes the conditions of the two flip-flops 46 and 47 to reverse so that a positive fluid output pulse appears at output channel 47A as shown in FIG. 5(G)(3) and remains until the next positive output pulse appears at the output channel 45B in response to the reception at pipe 53 of a control signal (A) which has reached the minimum threshold level.

The following specific embodiment of this invention, which is not intended to be limiting in nature, is set forth solely as an illustrative example so that those skilled in the art may more readily understand and practice the invention. One manifold indicated in FIG. 4 as $P_o$ was used to supply air to the entire cigarette inspecting system except that a separate air source was required to pressurize the cigarette rod being tested. This air source was separately supplied from a different line in order to minimize noise, wave reflections and disturbances that are to be expected in manifolds. The common air manifold $P_o$ was used in conjunction with the restrictors 48, 49 and 50 and the valves 51 and 52 to deliver the required pressure and flow at different areas in the fluidic control circuit. An example of the operating pressures in psig used at the various supply pipes in FIG. 4 is:

Pipe 53 — 0.35 to 0.4
Pipe 55 — 1.6
Pipe 57 — 5.5
Pipe 56 — 0.5 to 1.0
Pipe 58 — 5.5
Source $P_o$ — 12.5

The line used for connecting the various fluidic components of FIG. 4 is 0.125 inch diameter tubing. The restrictors are all 0.75 inch long and have the following diameters:

Restrictor 48 — 0.031 inch

Restrictor 49 — 0.037 inch

Restrictor 50 — 0.055 inch

The overall operation of the leak detection system is as follows. Cigarette rods are supplied to the inspection drum 1 by conventional means (not shown). As the drum rotates in a clockwise manner, as viewed in FIG. 1, the cigarette rods are brought closer to the inspection station. The rods are secured to the drum in the grooves of the annular bands 3 and 4 by the vacuum pressure at the holes 5. As the drum completes each 1/14th revolution, the nozzles 23 and 24 are inserted into the adjacent holes 21 and 22 and engage the ends of the cigarette rod which is adjacent these holes. Compressed air is supplied to the nozzles 23 and 24 through the pipe 29, and a back pressure signal which is indicative of the amount of air leaking from the cigarette rod appears at pipe 34, which is connected to pipe 53 of FIG. 4. The timing signal which is generated as the slots 40 pass the orifice of pipe 39, is coupled to the pipe 54 of FIG. 4.

As described hereinabove, a rejection signal which is shown in FIG. 5(G)(3) is developed each time that the back pressure signal at pipe 34 of FIG. 1 falls below a minimum predetermined threshold level. This rejection signal, which appears at pipe 59 of FIG. 4, is coupled to pipe 20 of FIGS. 1 and 2. The pipe 20 is coupled through the hole 19 in the disc 18 to that particular vacuum pipe 9 which is situated at the lower-most position within the drum 1. The remaining pipes 9 which are connected at one end to the vacuum manifold are blocked at their other end by the disc 18. The rejection signal (G) is slightly delayed due to the phase of the timing signal. This permits the drum 1 to begin to rotate after a faulty cigarette rod has been inspected before the rejection signal (G) is applied to the pipe 20 of FIG. 1 and 2.

The time available for the rejection period in this particular embodiment is about 60 milliseconds, which is sufficient to reject the cigarette rod in the station next to the inspection station. The word "station" is used herein to denote the physical location on the drum, which in this particular embodiment is 1/14th of the drum circumference. The rejection signal (G) which has been developed by the power flip-flop 47 is sufficient in amplitude to fill out the connecting pipes and the cigarette drum vacuum cavities associated with the faulty cigarette rod. The pressure is high enough to overcome the vacuum and create about one psi above atmosphere. During the 60 millisecond period available to reject a faulty cigarette rod, that rod has progressed into the rejection station and is dropped down by the combined effects of gravity and centrifugal force. The acceptable rods which have not been rejected are removed from the drum by suitable means (not shown) at a station after the rejection station.

Using this pneumatic output directly on the leaky cigarette rod simplifies the rejection operation considerably. It eliminates the need for any moving parts, transducers and time delay devices.

This system can be used to inspect any hollow or filled-out rods, tubes, and the like for leaks. When the article to be inspected has more than one opening, a fluid under pressure may be applied to all of the openings as shown in the above described embodiment. If the article has only one hole, a single nozzle could be used to supply the compressed fluid to the article. Regardless of the method used to pressurize the tested article, a resulting back pressure signal would be available to actuate a fluid-operated logic network as taught by this invention.

What is claimed is:

1. A pneumatic control circuit for monitoring a train of pneumatic pulses and providing a delayed indication of the presence of a pulse having an amplitude below a predetermined threshold level, said control circuit comprising:

means for generating a train of pneumatic timing pulses, the phase of which is delayed with respect to the phase of said monitored pulses, pneumatic trigger means having a control nozzle to which said train of monitored pulses is connected and having first and second output channels, an output signal appearing in said first output channel when the amplitude of said monitored pulses is less than said threshold level, the output switching from said first channel to said second channel when said monitored pulses exceed said threshold level, NOR gate means connected to said pneumatic trigger output channels, said timing pulses also being connected to said NOR gate means, and bistable pneumatic means connected to said NOR gate means for providing an output pneumatic pulse whenever the amplitude of one of said monitored pulses is below said threshold level, said output pulse being in phase with said timing pulse.

2. A pneumatic control circuit in accordance with claim 1 wherein said NOR gate means comprises first and second pneumatic NOR gates each having first and second control nozzles and an output channel, said first control nozzles being respectively connected to said first and second pneumatic trigger output channels, said timing signal being connected to said second NOR gate control nozzles, said NOR gate output channels being connected to said bistable pneumatic means.

3. A fluidic control circuit comprising:

a first terminal for receiving a fluid input signal, a second terminal for receiving a train of fluid timing pulses, pneumatic trigger means having first and second control nozzles and first and second output channels, said first terminal being connected to said first control nozzle, an output signal appearing in said first output channel when the amplitude of said fluid input signal is less than a predetermined threshold level, an output signal appearing in said second output channel when said fluid input signal exceeds said threshold level, a first NOR gate having a first control nozzle connected to said second output channel of said pneumatic trigger means and a second control nozzle connected to said second terminal, a stable output channel at which an output signal appears in the absence of an input signal at either of said first or second control nozzles, and an unstable output channel at which an output signal appears when an input signal is present at either of said first or second control nozzles.

4. A fluidic control circuit in accordance with claim 3 further comprising means for connecting a source of constant pressure at said second control nozzle of said pneumatic trigger.

5. A fluidic control circuit in accordance with claim 4 further comprising a load-insensitive fluid flip-flop having first and second control nozzles and first and second output channels, said stable output channel of said first NOR gate being connected to said first control nozzle of said load-insensitive flip-flop.

6. A fluidic control circuit in accordance with claim 5 further comprising a second NOR gate having first and second control nozzles, a stable output channel from which an output signal flows in the absence of an input signal at either said first or said second control nozzles and an unstable output channel from which a fluid signal flows in the presence of a fluid signal at either of said first or second control nozzles, said stable output channel of said second NOR gate being connected to said second control nozzle of said load-insensitive flip-flop.

7. A control circuit in accordance with claim 6 further comprising an output fluid flip-flop having first and second control nozzles and first and second output channels, said first and second control nozzles being connected to said first and second output channels of said load-insensitive flip-flop, respectively, and means connected to said first output channel of said output fluid flip-flop for utilizing the fluid output signal appearing thereat, said fluid output signal occuring after the level of said fluid input signal appearing at said first terminal drops below said predetermined threshold level.

8. A fluidic control circuit in accordance with claim 7 further comprising a pipe having a discharge orifice at one end thereof, the other end being connected by a restrictor to a source of fluid under pressure, a timing disc having at least one hole therein which is adapted to vent said orifice each time said hole is disposed adjacent thereto, said other end of said pipe being connected to said second terminal.

9. A fluidic control circuit in accordance with claim 8 wherein said fluid input signal comprises a train of pneumatic pulses, the frequency of which is equal to that of said timing pulses.

10. A fluidic control circuit in accordance with claim 3 further comprising means connected to the stable output channel of said first NOR gate for memorizing the state of said NOR gate.

11. A fluidic control circuit comprising:

a first terminal for receiving a fluid input signal, pneumatic trigger means having first and second control nozzles and first and second output channels, said first terminal being connected to said first control nozzle, an output signal appearing in said first output channel when the amplitude of said fluid input signal is less than a predetermined threshold level, an output signal appearing in said second output channel when said fluid input signal exceeds said threshold level, a NOR gate having first and second control nozzles, a stable output channel from which fluid flows in the absence of a fluid input signal at said control nozzles and an unstable output channel from which a fluid signal flows in the presence of an input signal at either said first or said second control nozzle, said second output channel of said pneumatic trigger means being connected to said first control nozzle of said NOR gate, and means connected to said stable output channel of said NOR gate for utilizing the fluid signal provided thereby.

12. A fluidic control circuit in accordance with claim 11 wherein said fluid input signal comprises a periodic train of pulses, said circuit further comprising a second terminal for receiving a train of fluid timing pulses the frequency of which is the same as that of said fluid input signal, said second terminal being connected to the second control nozzle of said NOR gate, whereby said NOR gate discharges through the unstable output channel thereof directly to the atmosphere in response to an input signal pulse having an amplitude greater than said predetermined threshold level, and said NOR gate discharges through the stable output channel thereof to said utilization means in response to an input signal pulse having an amplitude below said threshold level.

13. A fluidic control circuit in accordance with claim 12 further comprising a pipe having a discharge orifice at one end thereof, the other end being connected by a restrictor to a source of fluid under pressure, a timing disc having at least one hole therein which is adapted to vent said orifice each time said hole is disposed adjacent thereto, said other end of said pipe being connected to said second terminal.

14. A fluidic control circuit in accordance with claim 13 further comprising means for connecting a source of constant pressure to said second control nozzle of said pneumatic trigger.

15. A fluidic control circuit for monitoring a train of fluid pulses, said circuit comprising means for providing a fluid timing signal the frequency of which is equal to that of said train of pulses, and control means for receiving said train of fluid pulses and connected to said timing signal means for generating a fluid output pulse whenever one of said train of pulses falls below said predetermined threshold level, the leading edge of said output pulse being in phase with the leading edge of one of said timing pulses.

16. A control circuit in accordance with claim 15 wherein said control means comprises pneumatic trigger means having a control nozzle to which said train of fluid pulses is applied and having first and second output channels, an output signal appearing in said first out-put channel when the amplitude of one of said train of fluid pulses is less than a predetermined threshold level, the output signal switching from said first channel to said second channel when one of said train of fluid pulses exceeds said threshold level, NOR gate means connected to said pneumatic trigger output channels, said timing signal also being connected to said NOR gate means, and bistable pneumatic means connected to said NOR gate means for producing said fluid output pulse.

17. A control circuit in accordance with claim 16 which further comprises means connected to said pneumatic trigger means for adjusting said threshold level.

18. A control circuit in accordance with claim 16 wherein said NOR gate means comprises first and second pneumatic NOR gates each having first and second control nozzles and at least one output channel, said first NOR gate control nozzles being respectively connected to said first and second pneumatic trigger output channels, said timing signal being connected to said second NOR gate control nozzles, said NOR gate output channels being connected to said bistable pneumatic means.

19. A control circuit in accordance with claim 18 wherein said bistable pneumatic means comprises a pair of cascaded pneumatic flip-flops having an output channel at which said fluid output pulse appears and first and second control nozzles which are respectively coupled to the output channels of said first and second NOR gates.

20. A fluidic control circuit for monitoring a train of fluid pulses and providing a utilization device with a delayed indication of the presence of a pulse having an amplitude below the predetermined threshold level, said circuit comprising first bistable fluid amplifier means operatively connected to said utilization device and shiftable between a normal condition in which it does not provide said utilization device with a fluid output signal and a second condition in which it does provide said utilization device with a fluid output signal, second bistable fluid amplifier means to produce a normal output signal only when the amplitude of one of said train of fluid pulses is above said threshold level and a contrasting output signal when the amplitude of one of said train of fluid pulses is below said threshold level, timing means for producing a train of fluid tim-ing pulses having the same frequency as said train of fluid pulses, each timing pulse occuring during the duration of one of said train of fluid pulses, and third fluid amplifier means responsive only to concurrent contrasting signals from both said signal producing means to switch said first bistable fluid amplifier to its second condition.

21. A fluidic control circuit in accordance with claim 20 including means responsive only to a contrasting signal from said means for producing a train of timing pulses concurrently with a normal output signal from said second bistable fluid amplifier means to reset said bistable means to its normal condition.

22. In an apparatus comprising:

means providing a train of fluid pulses, and utilization means for receiving a fluid output pulse when the amplitude of one of said train of pulses falls below a predetermined threshold level, the phase of said fluid output pulse being delayed with respect to that of said one of said train of pulses, wherein the improvement comprises:

first bistable fluid amplifier means operatively connected to said utilization means and shiftable between a normal condition in which it does not provide said utilization means with a fluid output signal and a second condition in which it does provide said utilization device with a fluid output signal, second bistable fluid amplifier means to produce a normal output signal only when the amplitude of one of said train of fluid pulses is above said threshold level and a contrasting output signal when the amplitude of one of said train of fluid pulses is below said threshold level, timing means for producing a train of fluid timing pulses having the same frequency as said train of fluid pulses, each timing pulse occuring during the duration of one of said train of fluid pulses, and third fluid amplifier means responsive only to concurrent contrasting signals from both said signal producing means to switch said first bistable fluid amplifier to its second condition.

* * * * *